(12) United States Patent
Yang

(10) Patent No.: US 11,051,215 B2
(45) Date of Patent: Jun. 29, 2021

(54) SWITCHING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 8 days.

(21) Appl. No.: 16/577,247

(22) Filed: Sep. 20, 2019

(65) Prior Publication Data
US 2020/0015134 A1 Jan. 9, 2020

Related U.S. Application Data

(63) Continuation of application No. PCT/CN2017/077927, filed on Mar. 23, 2017.

(51) Int. Cl.
*H04W 36/00* (2009.01)
*H04W 36/08* (2009.01)
(Continued)

(52) U.S. Cl.
CPC ....... *H04W 36/0058* (2018.08); *H04W 36/08* (2013.01); *H04W 76/14* (2018.02); *H04W 76/30* (2018.02); *H04W 92/18* (2013.01)

(58) Field of Classification Search
CPC ..... H04W 36/08; H04W 76/30; H04W 92/18; H04W 36/0058; H04W 36/0059;
(Continued)

(56) References Cited

U.S. PATENT DOCUMENTS

2013/0102314 A1 4/2013 Koskela et al.
2014/0135019 A1 5/2014 Jang et al.
(Continued)

FOREIGN PATENT DOCUMENTS

CN 102783211 A 11/2012
CN 104581834 A 4/2015
(Continued)

OTHER PUBLICATIONS

International Search Report dated Dec. 6, 2017; PCT/CN2017/077927.
(Continued)

*Primary Examiner* — Brian D Nguyen

(57) ABSTRACT

The present application discloses a switching method, a terminal device and a network device. The method includes: a first terminal device acquires measurement results of links, where the links include a link between the first terminal device and a first network device and a link between the first network device and a second terminal device; and the first terminal device determines a first switching scheme for the first terminal device and/or a second switching scheme for the second terminal device according to the measurement results. Therefore, after cell switching is performed between a relay terminal and a remote terminal, an effective relay transmission continues between a relay terminal device and a remote terminal device.

20 Claims, 7 Drawing Sheets

(51) Int. Cl.
*H04W 76/14* (2018.01)
*H04W 76/30* (2018.01)
*H04W 92/18* (2009.01)

(58) Field of Classification Search
CPC . H04W 36/0085; H04W 36/36; H04W 88/04; H04W 76/14; H04W 48/20
See application file for complete search history.

(56) References Cited

U.S. PATENT DOCUMENTS

| | | | |
|---|---|---|---|
| 2015/0222345 A1 | 8/2015 | Chapman et al. | |
| 2016/0157283 A1 | 6/2016 | Yu et al. | |
| 2017/0103166 A1* | 4/2017 | Oh | A61B 5/02055 |
| 2017/0235935 A1* | 8/2017 | Song | A61B 5/681 726/19 |
| 2018/0359671 A1* | 12/2018 | Xu | H04W 36/0083 |
| 2019/0149647 A1* | 5/2019 | Heo | H04M 1/7253 455/41.2 |
| 2019/0159018 A1* | 5/2019 | Basu Mallick | H04W 4/023 |
| 2019/0166640 A1* | 5/2019 | Wei | H04W 28/10 |
| 2020/0220734 A1* | 7/2020 | Sun | H04W 12/06 |

FOREIGN PATENT DOCUMENTS

| | | |
|---|---|---|
| CN | 105577907 A | 5/2016 |
| JP | 2009081547 A | 4/2009 |

OTHER PUBLICATIONS

The EESR of corresponding European application No. 17902430.2, dated May 8, 2020.

LG Electronics: "UE-to-Network Relay release procedure", 3GPP Draft; S2-151796_WAS1613_TR23713_UE-Network Relay Release Procedure, 3rd Generation Partnership Project (3GPP), vol. SA WG2, No. Fukuoka, Japan; May 25, 2015-May 29, 2015 May 29, 2015(May 29, 2015), XP050979897.

Intel Corporation et al: "Paired mobility", 3GPP Draft; R2-1701302, 3rd Generation Partnership Project (3GPP), vol. RAN WG2, No. Athens, Greece; Feb. 13, 2017-Feb.17, 2017 Feb. 12, 2017(Feb. 12, 2015), XP051211967.

Nokia et al: "Pairing, RRC states and Control Plane relaying", 3GPP Draft; R2-166746_D2D CP PLANE_V4, 3rd Generation Partnership Project (3GPP), vol. RAN WG2, No. Kaohsiung, Taiwan; Oct. 10, 2016-Oct. 14, 2016 Oct. 9, 2016(Oct. 9, 2016), XP051151213.

ZTE; "UE mobility aspect", 3GPP Draft; R2-166796 UE Mobility Aspect in the Evolved UE-to-Network Relay Architecture, 3rd Generation Partnership Project (3GPP), vol. RAN WG2, No. Kaohsiung; Oct. 10, 2016-Oct. 14, 2016 Oct. 9, 2016(Oct. 9, 2016), XP051151251.

Huawei, HiSilicon, Sony, LG Electronics, Intel. 3GPP TSG-RAN WG2 #97bis R2-1703469; Group mobility procedures, Spokane; Washington, USA, Apr. 3-7, 2017.

LG Electronics Inc. 3GPP TSG-RAN2 Meeting #97bis R2-1703627; Group mobility of linked remote UE, Spokane, U.S.A., Apr. 3-7, 2017.

The first Office Action of corresponding Korean application No. 10-2019-7029273, dated Jan. 12, 2021.

3GPP TSG RAN WG2, Meeting #89bis, R2-151068, Discussion on D2D communications handover for service continuity, Apr. 10, 2015.

3GPP TSG SA WG2, Meeting #108, S2-150787, ProSe UE to network Relay & Service continuity solution, Apr. 6, 2015.

The first Office Action of corresponding Indian application No. 201917039858, dated Jan. 27, 2021.

The first Office Action of corresponding Japanese application No. 2019-552028, dated Mar. 30, 2021.

* cited by examiner

400

A first terminal device acquires measurement results of links, where the links include a link between the first terminal device and a first network device and a link between the first network device and a second terminal device ~ 410

The first terminal device determines a first switching scheme for the first terminal device and/or a second switching scheme for the second terminal device according to the measurement results ~ 420

A second terminal device acquires a measurement result of a link, where the link includes a measurement result of a link between the second terminal device and a first network device ~ 510

The second terminal device transmits the measurement result to the first terminal device, where the measurement result is used for the first terminal device to determine a second switching scheme for the second terminal device ~ 520

The second terminal device receives a switching command transmitted by the first terminal device, and performs the second switching scheme according to the switching command ~ 530

FIG. 5

SWITCHING METHOD, TERMINAL DEVICE, AND NETWORK DEVICE

CROSS-REFERENCE TO RELATED APPLICATIONS

This application is a continuation of International Application No. PCT/CN2017/077927 filed on Mar. 23, 2017, the content of which is incorporated herein by reference in its entirety.

TECHNICAL FIELD

Embodiments of the present application relate to the field of wireless communications and, in particular, to a switching method, a terminal device, and a network device.

BACKGROUND

In an existing wireless communication system, a Remote User Equipment ("Remote UE" for short) such as a wearable device may perform data transmission through a relay terminal such as an existing ordinary mobile terminal (Relay User Equipment, "Relay UE" for short). As shown in FIG. 1, the relay terminal may help the remote terminal to complete the data transmission. Moreover, as shown in FIG. 2(a) and FIG. 2(b), the relay terminal and the remote terminal may establish a control plane connection through the same base station or different base stations, and meanwhile the relay terminal helps the remote terminal to complete forwarding of data. At this point, if the relay terminal or the remote terminal moves, a switch from the base station will be required to ensure continuity of the data transmission.

However, in practical applications, the relay terminal and the remote terminal are likely to be in the same location, for example, on a user. At this point, it is very likely that both of them are moving at the same speed in the same direction simultaneously. If cell switching is required during the movement, at present, the base station generally performs separate switches for the two terminal devices, in this way, if two terminals are switched to cells covered by different base stations, a great impact will be generated for relay transmission between the relay terminal and the remote terminal.

SUMMARY

Embodiments of the present application provide a switching method, a terminal device and a network device, which enable an effective relay transmission to continue between a relay terminal and a remote terminal after cell switching is performed between the relay terminal and the remote terminal.

In a first aspect, a switching method is provided, including: acquiring, by a first terminal device, measurement results of links, where the links include a link between the first terminal device and a first network device and a link between the first network device and a second terminal device; and determining, by the first terminal device, a first switching scheme for the first terminal device and/or a second switching scheme for the second terminal device according to the measurement results.

Therefore, a terminal device determines switching schemes for two terminal devices by acquiring link information of a relay terminal device and link information of a remote terminal device, so that the two terminal devices may be located in a cell covered by a same network device as much as possible after they perform cell switching or cell reselection, and thus an effective relay transmission continues between a relay terminal and a remote terminal after cell switching is performed between the relay terminal and the remote terminal.

Moreover, since the first switching scheme and the second switching scheme are determined by the terminal device, in this way, when the terminal device stays in an inactive state or an idle state, the terminal device may determine the switching schemes by itself without by a network device so that better continuity of services between terminal devices is guaranteed.

Due to a comprehensive consideration of measurement results of multiple links, the first network device may try to select a cell covered by a same network device as a cell to be switched or as a reselected cell to be accessed for the first terminal device and the second terminal device. For example, if there is a service data interaction between the first terminal device and the second terminal device, when the two terminal devices need to perform cell switching during movement, the first network device will try to select as much as possible, according to respective measurement results of links of the two terminal devices, a cell covered by a same network device as a cell to be switched for the first terminal device and the second terminal device when determining the first switching scheme and the second switching scheme, so that continuity of services between the terminal devices is guaranteed, despite that the switched signal strength is not optimal.

In an implementation of the first aspect, the links further include a link between the first terminal device and the second terminal device.

In an implementation of the first aspect, the method further includes: transmitting, by the first terminal device, a switching command to the second terminal device, where the switching command is used to instruct the second terminal device to perform the second switching scheme.

In an implementation of the first aspect, the determining, by the first terminal device, the first switching scheme for the first terminal device and/or the second switching scheme for the second terminal device according to the measurement results includes: determining, by the first terminal device, the first switching scheme and/or the second switching scheme according to states in which the first terminal device and the second terminal device stay and the measurement results.

In an implementation of the first aspect, if the first terminal device stays in a connected state, the first switching scheme includes that the first terminal device is switched from a cell covered by the first network device to a cell covered by a second network device, or the first terminal device does not perform cell switching;

if the first terminal device stays in an inactive state or an idle state, the first switching scheme includes that the first terminal device reselects a cell covered by the second network device as a cell to be accessed, or the first terminal device does not perform cell reselection;

if the second terminal device stays in a connected state, the second switching scheme includes that the second terminal device is switched from a cell covered by the first network device to a cell covered by the second network device or a cell covered by other network devices, or the second terminal device does not perform cell switching;

if the second terminal device stays in an inactive state or an idle state, the second switching scheme includes that the second terminal device reselects a cell covered by the second network device or a cell covered by other network devices as a cell to be accessed, or the second terminal device does not perform cell reselection.

In an implementation of the first aspect, the determining, by the first terminal device, the first switching scheme for the first terminal device and/or the second switching scheme for the second terminal device according to the measurement results includes: determining, by the first terminal device, according to the measurement results, whether a link connection is maintained between the first terminal device and the second terminal device; and determining, by the first terminal device, the first switching scheme and/or the second switching scheme according to whether a link connection is maintained between the first terminal device and the second terminal device.

In an implementation of the first aspect, if the first terminal device determines that a link connection is maintained between the first terminal device and the second terminal device, the first terminal device and the second terminal device are located in a cell covered by a same network device after the first terminal device performs the first switching scheme and the second terminal device performs the second switching scheme.

In an implementation of the first aspect, if the first terminal device determines that link connection is not maintained between the first terminal device and the second terminal device, the method further includes: transmitting, by the first terminal device, release indication information to the second terminal device; where the release indication information is used to instruct the second terminal device to release a link connection with the first terminal device.

In an implementation of the first aspect, before the determining, by the first terminal device, the first switching scheme for the first terminal device and/or the second switching scheme for the second terminal device according to the measurement results, the method further includes: acquiring, by the first terminal device, associated information between the first terminal device and the second terminal device, where the associated information includes a pairing relationship or a connection relationship between the first terminal device and the second terminal device;

the determining, by the first terminal device, the first switching scheme for the first terminal device and/or the second switching scheme for the second terminal device according to the measurement results includes: determining, by the first terminal device, the first switching scheme and/or the second switching scheme according to the associated information and the measurement results.

In an implementation of the first aspect, if the first terminal device stays in a connected state, the method further includes: transmitting, by the first terminal device, switching information to the first network device, where the switching information includes at least one of the following information: information of the first switching scheme, information of the second switching scheme, and the measurement results.

In an implementation of the first aspect, before the determining, by the first terminal device, the first switching scheme for the first terminal device and/or the second switching scheme for the second terminal device according to the measurement results, the method further includes: receiving, by the first terminal device, configuration information transmitted by the first network device, where the configuration information is used to instruct the first terminal device to preferentially transmit information of a cell to be switched by the first terminal device, the cell to be switched enables the first terminal device and the second terminal device to meet a signal strength condition and to be located in a cell covered by a same network device.

In an implementation of the first aspect, the first terminal device is a relay terminal device, and the second terminal device is a remote terminal device; or the first terminal device is a remote terminal device, and the second terminal device is a relay terminal device.

In an implementation of the first aspect, the measurement results of the links include measurement results of link quality of the links, and/or measurement results of link state of the links.

In an implementation of the first aspect, the acquiring, by the first terminal device, the measurement results of the links includes: determining, by the first terminal device, a measurement result of a link between the first terminal device and the first network device, and receiving a measurement result of a link between the first network device and the second terminal device that is transmitted by the second terminal device.

In an implementation of the first aspect, the acquiring, by the first terminal device, the measurement results of the links further includes: determining, by the first terminal device, a measurement result of a link between the first terminal device and the second terminal device; or receiving, by the first terminal device, a measurement result of a link between the first terminal device and the second terminal device that is transmitted by the second terminal device.

In an implementation of the first aspect, the acquiring, by the first terminal device, the measurement results of the links includes: acquiring, by the first terminal device, a measurement result of a link that is transmitted by the second terminal device and is carried in an adaptation layer or a direct interface protocol stack PC5.

In a second aspect, a switching method is provided, including: acquiring, by a second terminal device, a measurement result of a link, where the link includes a measurement result of a link between the second terminal device and a first network device; transmitting, by the second terminal device, the measurement result to the first terminal device, where the measurement result is used for the first terminal device to determine a second switching scheme for the second terminal device; and receiving, by the second terminal device, a switching command transmitted by the first terminal device, and performing the second switching scheme according to the switching command.

Therefore, a terminal device may allow an another terminal device to determine switching schemes for the two terminal devices according to link information of the two terminal devices by reporting its own link information to the another terminal device, so that the two terminal devices may be located in a cell covered by a same network device as much as possible after they perform cell switching or cell reselection, and thus an effective relay transmission continues between a relay terminal and a remote terminal after cell switching is performed between the relay terminal and the remote terminal.

Moreover, since the first switching scheme and the second switching scheme are determined by the terminal device, in this way, when the terminal device stays in an inactive state or an idle state, the terminal device may determine the switching schemes by itself without by a network device so that better continuity of services between terminal devices is guaranteed.

In an implementation of the second aspect, the link further includes a link between the first terminal device and the second terminal device.

In an implementation of the second aspect, if the first terminal device stays in a connected state, the first switching scheme includes that the first terminal device is switched from a cell covered by the first network device to a cell covered by a second network device, or the first terminal device dose not perform cell switching;

if the first terminal device stays in an inactive state or an idle state, the first switching scheme includes that the first terminal device reselects a cell covered by the second network device as a cell to be accessed, or the first terminal device does not perform cell reselection;

if the second terminal device stays in a connected state, the second switching scheme includes that the second terminal device is switched from a cell covered by the first network device to a cell covered by the second network device or a cell covered by other network devices, or the second terminal device does not perform cell switching;

if the second terminal device stays in an inactive state or an idle state, the second switching scheme includes that the second terminal device reselects a cell covered by the second network device or a cell covered by other network devices as a cell to be accessed, or the second terminal device does not perform cell reselection.

In an implementation of the second aspect, if the first terminal device determines that a link connection is maintained between the first terminal device and the second terminal device, the second terminal device and the first terminal device are located in a cell covered by a same network device after the second terminal device performs the second switching scheme.

In an implementation of the second aspect, if the first terminal device determines that link connection is not maintained between the first terminal device and the second terminal device, the method further includes: receiving, by the second terminal device, release indication information transmitted by the first terminal device, and releasing a link connection with the first terminal device according to the release indication information.

In an implementation of the second aspect, the first terminal device is a relay terminal device, and the second terminal device is a remote terminal device; or the first terminal device is a remote terminal device, and the second terminal device is a relay terminal device.

In an implementation of the second aspect, the measurement result of the link includes a measurement result of link quality of the link, and/or a measurement result of link state of the link.

In an implementation of the second aspect, the transmitting, by the second terminal device, the measurement result to the first terminal device includes: transmitting, by the second terminal device, the measurement result that is carried in an adaptation layer or a direct interface protocol stack PC5 to the first terminal device.

In a third aspect, a switching method is provided, including: receiving, by a first network device, switching information transmitted by a first terminal device, where the switching information includes at least one of the following information: a first switching scheme for the first terminal device and a second switching scheme for a second terminal device that are determined by the first terminal device and measurement results of links, where the links include a link between the first terminal device and the first network device and a link between the second terminal device and the first network device; and confirming, by the first network device, the first switching scheme and/or the second switching scheme according to the switching information.

Therefore, after receiving information of a switching scheme transmitted by a terminal device and determined by the terminal device, a network device confirms the switching scheme to determine whether respective switching schemes for a relay terminal device and a remote terminal device are appropriate. Since the switching scheme determined by the terminal device enables two terminal devices to be located in cells covered by themselves as much as possible after they perform cell switching or cell reselection, and thus an effective relay transmission continues between a relay terminal and a remote terminal after cell switching is performed between the relay terminal and the remote terminal.

In an implementation of the third aspect, the links further include a link between the first terminal device and the second terminal device.

In an implementation of the third aspect, the first switching scheme includes that the first terminal device is switched from a cell covered by the first network device to a cell covered by the second network device, or the first terminal device does not perform cell switching; the second switching scheme includes that the second terminal device reselects a cell covered by the second network device or a cell covered by other network devices as a cell to be accessed, or the second terminal device does not perform cell reselection.

In an implementation of the third aspect, the method further includes: transmitting, by the first network device, configuration information to the first terminal device, where the configuration information is used to instruct the first terminal device to preferentially transmit information of a cell to be switched by the first terminal device, the cell to be switched enables the first terminal device and the second terminal device to meet a signal strength condition and to be located in a cell covered by a same network device.

In an implementation of the third aspect, the measurement results of the links include measurement results of link quality of the links, and/or measurement results of link state of the links.

In an implementation of the third aspect, the first terminal device is a relay terminal device, and the second terminal device is a remote terminal device; or the first terminal device is a remote terminal device, and the second terminal device is a relay terminal device.

In a fourth aspect, a terminal device is provided. The terminal device may perform an operation of the terminal device in the first aspect or any optional implementation thereof described above. In particular, the terminal device may include a modular unit for performing an operation of the terminal device in the first aspect or any possible implementation thereof described above.

In a fifth aspect, a terminal device is provided. The terminal device may perform an operation of the terminal device in the second aspect or any optional implementation thereof described above. In particular, the terminal device may include a modular unit for performing an operation of the terminal device in the second aspect or any possible implementation thereof described above.

In a sixth aspect, a network device is provided. The network device may perform an operation of the network device in the third aspect or any optional implementation thereof described above. In particular, the network device may include a modular unit for performing an operation of the network device in the third aspect or any possible implementation thereof described above.

In a seventh aspect, a terminal device is provided. The terminal device includes: a processor, a transceiver, and a memory, where the processor, the transceiver, and the memory communicate with each other through an internal connection path. The memory is configured to store an instruction, and the processor is configured to execute the instruction stored in the memory. When the processor executes the instruction stored in the memory, such execution causes the terminal device to perform the method in the first aspect or any possible implementation thereof, or such execution causes the terminal device to implement the terminal device provided in the fourth aspect.

In an eighth aspect, a terminal device is provided. The terminal device includes: a processor, a transceiver, and a memory, where the processor, the transceiver, and the memory communicate with each other through an internal connection path. The memory is configured to store an instruction, and the processor is configured to execute the instruction stored in the memory. When the processor executes the instruction stored in the memory, such execution causes the terminal device to perform the method in the second aspect or any possible implementation thereof, or such execution causes the terminal device to implement the terminal device provided in the fifth aspect.

In a ninth aspect, a network device is provided. The network device includes: a processor, a transceiver, and a memory, where the processor, the transceiver, and the memory communicate with each other through an internal connection path. The memory is configured to store an instruction, and the processor is configured to execute the instruction stored in the memory. When the processor executes the instruction stored in the memory, such execution causes the network device to perform the method in the third aspect or any possible implementation thereof, or such execution causes the network device to implement the network device provided in the sixth aspect.

In a tenth aspect, a computer readable storage medium is provided. The computer readable storage medium is stored with a program causing a terminal device to perform any switching method in the first aspect and various implementations thereof described above.

In an eleventh aspect, a computer readable storage medium is provided. The computer readable storage medium is stored with a program causing a terminal device to perform any switching method in the second aspect and various implementations thereof described above.

In a twelfth aspect, a computer readable storage medium is provided. The computer readable storage medium is stored with a program causing a network device to perform any switching method in the third aspect or various implementations thereof described.

In a thirteenth aspect, a system chip is provided. The system chip includes an input interface, an output interface, a processor, and a memory, where the processor is configured to execute an instruction stored in the memory, and when the instruction is executed, the processor may implement any method in the first aspect and various implementations thereof described above.

In a fourteenth aspect, a system chip is provided. The system chip includes an input interface, an output interface, a processor, and a memory, where the processor is configured to execute an instruction stored in the memory, and when the instruction is executed, the processor may implement any method in the second aspect and various implementations thereof described above.

In a fifteenth aspect, a system chip is provided. The system chip includes an input interface, an output interface, a processor, and a memory, where the processor is configured to execute an instruction stored in the memory, and when the instruction is executed, the processor may implement any method in the third aspect and various implementations thereof described above.

BRIEF DESCRIPTION OF DRAWING(S)

FIG. 4 is a schematic flowchart of a switching method according to an embodiment of the present application.

FIG. 5 is a schematic flowchart of a switching method according to an embodiment of the present application.

DESCRIPTION OF EMBODIMENTS

Technical solutions in the embodiments of the present application will be described hereunder with reference to the accompanying drawings.

It should be understood that the technical solutions in the embodiments of the present application can be applied to various communication systems, such as a Global System of Mobile Communication ("GSM" for short), a Code Division Multiple Access ("CDMA" for short) system, a Wideband Code Division Multiple Access ("WCDMA" for short) system, a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a future 5G communication system, and the like.

Various embodiments are described in the present application in combination with a terminal device. The terminal device may also be termed as user equipment ("UE" for short), an access terminal, a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, an Session Initiation Protocol ("SIP" for short) phone, a Wireless Local Loop ("WLL" for short) station, a Personal Digital Assistant ("PDA" for short), a handheld device with wireless communication capabilities, a computing device or other processing devices connected to a wireless modem, an in-vehicle device, a wearable device, a terminal device in a future 5G network or a terminal device in a future evolved Public Land Mobile Network ("PLMN" for short) network, etc.

Various embodiments are described in the present application in combination with a network device. The network device may be a device in communication with the terminal device, such as a Base Transceiver Station ("BTS" for short) in a GSM or CDMA, or a NodeB ("NB" for short) in a WCDMA system, or an Evolutional Node B ("eNB" or "eNodeB" for short) in an LTE system, alternatively, the network device may be a relay station, an access point, an in-vehicle device, a wearable device, and a network side device in a future 5G network or a network side device in a future evolved PLMN network, etc.

Figure 1:
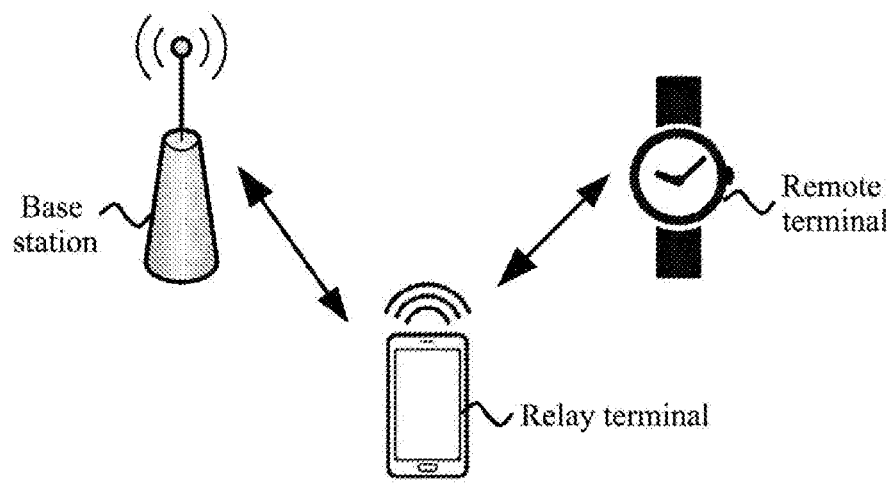
FIG. 1 is a schematic diagram showing relay transmission of a terminal device in the prior art.
Figure 2A:
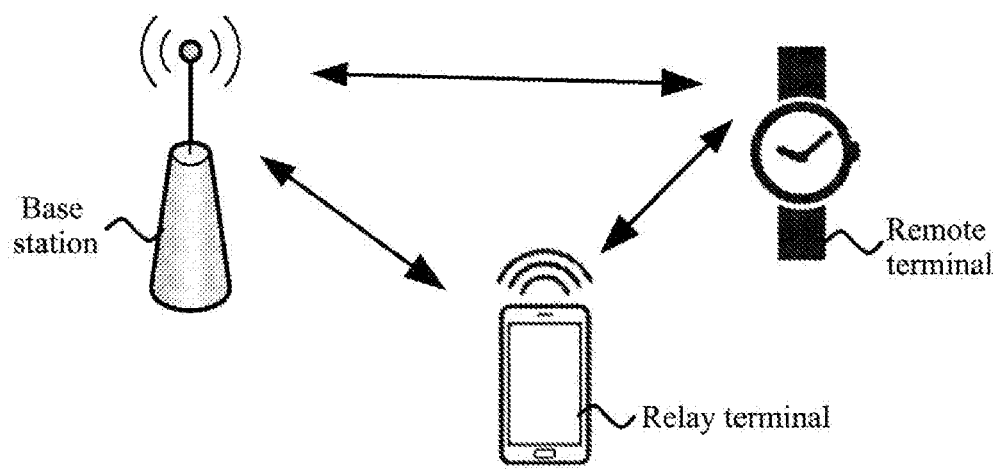
FIG. 2(a) is a schematic diagram showing relay transmission of a terminal device in the prior art.
Figure 2B:
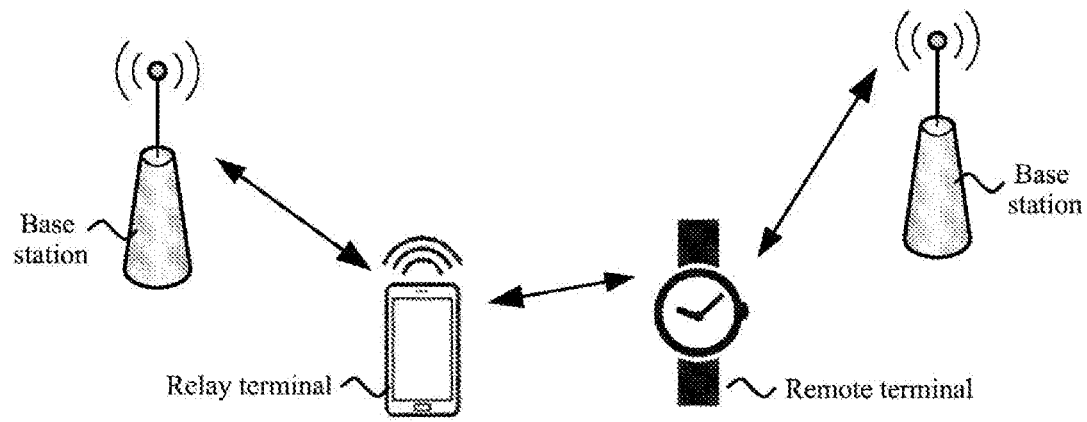
FIG. 2(b) is a schematic diagram showing relay transmission of a terminal device in the prior art.
Figure 3:
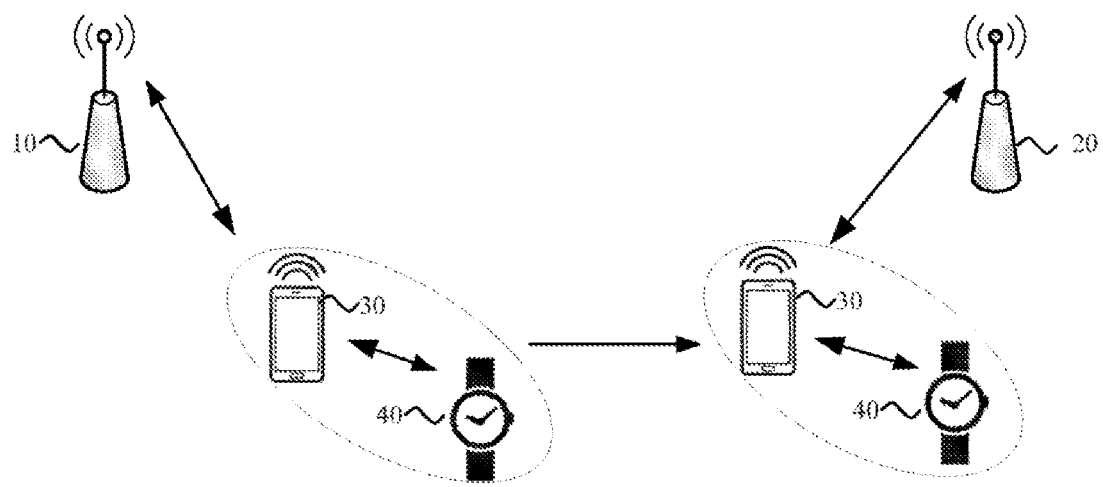
FIG. 3 is a schematic architecture diagram of an application scenario according to an embodiment of the present application.

FIG. 3 is a schematic diagram of an application scenario according to an embodiment of the present application. The communication system in FIG. 3 may include a network device 10, a network device 20, a terminal device 30, and a terminal device 40. The network device 10 is configured to provide communication services for the terminal device 30 and the terminal device 40. The terminal device 40 is a remote terminal device such as a watch, and the terminal device 30 is a relay terminal device such as a mobile phone. A data transmission may be performed between the terminal device 40 and the network device 10 via the terminal device 30. If the terminal device 30 and the terminal device 40 are in the same location, for example, on a user, at this point, the two terminal devices will move at the same speed in the same direction simultaneously. If cell switching is required during the movement, a great impact will be generated for relay transmission between the relay terminal and the remote terminal if the two terminal devices are switched to cells covered by different network devices. Therefore, when cell switching is performed during movement of the two terminal devices, it is desirable that the terminal device 30 and the terminal device 40 are switched to a cell covered by a same network device. As shown in FIG. 3, the terminal device 30 and the terminal device 40 are switched from a cell covered by the network device 10 to a cell covered by the network device 20, at this time, the terminal device 30 and the terminal device 40 may effectively perform a normal relay transmission. The arrows shown in FIG. 3 may represent uplink/downlink transmissions performed via the cellular link between the terminal device 20 and the network device 10.

The network in the embodiments of the present application may refer to a Public Land Mobile Network ("PLMN" for short) or a Device to Device ("D2D" for short) network or a Machine to Machine/Man ("M2M" for short) network or other networks. FIG. 3 is only a simplified schematic diagram of examples, and other terminal devices may also be included in the network, which are not shown in FIG. 3.

FIG. 4 is a schematic flowchart of a switching method 400 according to an embodiment of the present application. The method may be performed by a first terminal device, which may be a relay terminal device such as the terminal device 30 in FIG. 3 or a remote terminal device such as the terminal device 40 in FIG. 3. As shown in FIG. 4, the switching method includes:

At 410, a first terminal device acquires measurement results of links, where the links include a link between the first terminal device and a first network device and a link between the first network device and a second terminal device.

At 420, the first terminal device determines a first switching scheme for the first terminal device and/or a second switching scheme for the second terminal device according to the measurement results.

In an embodiment, at least one of the first terminal device and the second terminal device stays in an inactive state or an idle state.

In an embodiment, the first terminal device is a relay terminal device, and the second terminal device is a remote terminal device; or the first terminal device is a remote terminal device, and the second terminal device is a relay terminal device.

In an embodiment, the method further includes: the first terminal device performs the first switching scheme after determining the first switching scheme.

Specifically, when a first terminal device and a second terminal device are performing cell switching, the first terminal device may acquire a measurement result of a link between a first network device and the first terminal device and a measurement result of a link between the first network device and the second terminal device. The measurement results of the links can be used to determine a first switching scheme for the first terminal device, and determine a second switching scheme for the second terminal device. Since the first terminal device simultaneously acquires the measurement result of the link between the first terminal device and the first network device and the measurement result of the link between the second terminal device and the first network device, when the first terminal device determines respective switching schemes for the first terminal device and the second terminal device, measurement results of multiple links may be comprehensively considered so that a cell covered by a same network device is selected as a cell to be switched or as a reselected cell to be accessed for the first terminal device and the second terminal device as much as possible.

For example, if there is a service data interaction between the first terminal device and the second terminal device, when the two terminal devices need to perform cell switching during movement, the first network device will try to select as much as possible, according to respective measurement results of links of the two terminal devices, a cell covered by a same network device as a cell to be switched for the first terminal device and the second terminal device when determining the first switching scheme and the second switching scheme, so that continuity of services between the terminal devices is guaranteed, despite that the switched signal strength is not optimal.

Moreover, in this embodiment, since the first switching scheme and the second switching scheme are determined by the first terminal device, in this way, when the terminal device and/or the second terminal device stays in an inactive state or an idle state, the terminal device may determine the switching schemes by itself without by a network device so that better continuity of services between terminal devices is guaranteed.

Here, the first terminal device may determine a first switching scheme for the first terminal device, and determine a second switching scheme for the second terminal device; the first terminal device may also only determine the first switching scheme, while the second switching scheme is determined by the second terminal device itself.

If the first terminal device determines the second switching scheme for the second terminal device, in an embodiment, the method further includes: the first terminal device transmits a switching command to the second terminal device, where the switching command is used to instruct the second terminal device to perform the second switching scheme.

In an embodiment, the measurement results of the links acquired by the first terminal device may further include a measurement result of a link between the first terminal device and the second terminal device.

That is, the first terminal device not only may acquire a measurement result of a link between the first network device and the first terminal device and a measurement result of a link between the first network device and the second terminal device, but also may acquire a measurement result of a link between the first terminal device and the second terminal device, moreover, with a comprehensive consideration of measurement results of these three links, the first switching scheme and/or the second switching scheme are/is determined. Since a situation of a link between two terminal devices is considered, the two terminal devices are switched into a cell covered by a same network device as much as possible.

In an embodiment, the measurement results of the links include measurement results of link quality of the links, and/or measurement results of link state of the links.

Since the first terminal device may determine a measurement result of a link of the first terminal device, that is, a measurement result of a link between the first terminal device and the first network device and a measurement result of a link between the first terminal device and the second terminal device, while the second terminal device may determine a measurement result of a link of the second terminal device, that is, a measurement result of a link between the second terminal device and the first network device and a measurement result of a link between the second terminal device and the first terminal device. Thus, in an embodiment, in 410, the first terminal device acquiring the measurement results of the links includes: the first terminal device determines a measurement result of a link between the first terminal device and the first network device, and receives a measurement result of a link between the first network device and the second terminal device that is transmitted by the second terminal device.

Further, the first terminal device acquiring the measurement results of the links may further include: the first terminal device determines a measurement result of a link between the first terminal device and the second terminal device; or the first terminal device receives a measurement result of a link between the first terminal device and the second terminal device that is transmitted by the second terminal device.

In an embodiment, the first terminal device acquiring the measurement results of the links includes: the first terminal device acquires a measurement result of a link that is transmitted by the second terminal device and is carried in an adaptation layer or a direct interface protocol stack PC5.

That is, interaction information such as the measurement results among the first terminal device, the second terminal device, and the first network device may be carried in an adaptation layer or carried in signaling or data of an existing direct interface protocol stack PC5.

In an embodiment, in 410, the first terminal device determining the first switching scheme for the first terminal device and/or the second switching scheme for the second terminal device according to the measurement results includes: the first terminal device determines the first switching scheme and/or the second switching scheme according to states in which the first terminal device and the second terminal device stay and the measurement results.

In an embodiment, if the first terminal device stays in a connected state, the first switching scheme includes that the first terminal device is switched from a cell covered by the first network device to a cell covered by a second network device, or the first terminal device does not perform cell switching;

if the first terminal device stays in an inactive state or an idle state, the first switching scheme includes that the first terminal device reselects the cell covered by the second network device as a cell to be accessed, or the first terminal device does not perform cell reselection;

if the second terminal device stays in a connected state, the second switching scheme includes that the second terminal device is switched from a cell covered by the first network device to a cell covered by the second network device or a cell covered by other network devices, or the second terminal device does not perform cell switching;

if the second terminal device stays in an inactive state or an idle state, the second switching scheme includes that the second terminal device reselects the cell covered by the second network device or a cell covered by other network devices as a cell to be accessed, or the second terminal device does not perform cell reselection.

Here, if the first switching scheme causes the first terminal device to be switched or reselected to a cell covered by the second terminal device, the second switching scheme may cause the second terminal device to be switched or reselected to the same network device as the first terminal device, that is, into a cell covered by the second network device, however, in a case not allowed by a signal strength condition, alternatively, when there is no need to maintain a link connection between the first terminal device and the second terminal device, link connection should not be maintained, or it is not suitable any more to continue maintaining a link connection, the second terminal device may also be switched into a cell covered by other network devices or reselect a cell covered by other network devices as a cell to be accessed.

In an embodiment, the first terminal device determining the first switching scheme for the first terminal device and/or the second switching scheme for the second terminal device according to the measurement results includes: the first terminal device determines, according to the measurement results, whether a link connection is maintained between the first terminal device and the second terminal device; and the first terminal device determines the first switching scheme and/or the second switching scheme according to whether a link connection is maintained between the first terminal device and the second terminal device.

Further, if the first terminal device determines that a link connection is maintained between the first terminal device and the second terminal device, the first terminal device and the second terminal device are located in a cell covered by a same network device after the first terminal device performs the first switching scheme and the second terminal device performs the second switching scheme.

Specifically, if the first network device determines that a link connection is maintained between the first terminal device and the second terminal device, for example, when the first network device determines that a link connection should be maintained between the first terminal device and the second terminal device or there is a need to continue maintaining a link connection, the first switching scheme and/or the second switching scheme determined by the first network device will cause the first terminal device and the second terminal device to be located in a cell covered by a same network device after the first terminal device performs the first switching scheme and the second terminal device performs the second switching scheme.

If the first network device determines that link connection is not maintained between the first terminal device and the second terminal device, for example, if the first network device determines that link connection should not be maintained between the first terminal device and the second terminal device or there is no need to continue maintaining a link connection or signal strength cannot meet a requirement for a link between the first terminal device and the second terminal device, the first switching scheme and/or the second switching scheme determined by the first network device may cause the first terminal device and the second terminal device to be located in a cell covered by a same or a different network device after the first terminal device performs the first switching scheme and the second terminal device performs the second switching scheme.

In an embodiment, if the first terminal device determines that link connection is not maintained between the first terminal device and the second terminal device, the method further includes: the first terminal device transmits release indication information to the second terminal device, where the release indication information is used to instruct the second terminal device to release a link connection with the first terminal device.

In an embodiment, prior to 420, that is, before the first terminal device determines the first switching scheme for the first terminal device and/or the second switching scheme for the second terminal device according to the measurement results, the method further includes: the first terminal device acquires associated information between the first terminal device and the second terminal device, where the associated information includes a pairing relationship or a connection relationship between the first terminal device and the second terminal device.

The first terminal device determining the first switching scheme for the first terminal device and/or the second switching scheme for the second terminal device according to the measurement results includes: the first terminal device determines the first switching scheme and/or the second switching scheme according to the associated information and the measurement results.

Specifically, the first terminal device may further determine the first switching scheme and/or the second switching scheme according to the pairing relationship or the connection relationship between the first terminal device and the second terminal device together with the measurement results of the links. For example, if the first terminal device is in a connection relationship with the second terminal device and there is also a data interaction, the first terminal device will try to select as much as possible, according to the measurement results of the links, a cell covered by a same network device as a cell to be switched or as a reselected cell to be accessed for the first terminal device and the second terminal device when determining the first switching scheme and/or the second switching scheme, despite that the switched signal strength is not optimal.

In an embodiment, if the first terminal device stays in a connected state, the method further includes: the first terminal device transmits switching information to the first network device, where the switching information includes at least one of the following information: information of the first switching scheme, information of the second switching scheme, and the measurement results of the links.

Specifically, after determining the first switching scheme for the first terminal device and/or the second switching scheme for the second terminal device, the first terminal device may also report the first switching scheme and the second switching scheme to the first network device so that the first network device confirms the first switching scheme and/or the second switching scheme to determine whether the first terminal device and/or the second terminal device can perform their own switching schemes to switch to a suitable network. Information of the first switching scheme may include information of a cell to be switched or a cell reselected by the first terminal device (that is, a switching cell or a reselection cell that the first terminal device prefers), and information of the second switching scheme may include information of a cell to be switched or a cell reselected by the second terminal device (that is, a switching cell or a reselection cell that the second terminal device prefers).

For example, the first switching scheme determined by the first terminal device includes that the first terminal device is switched to a cell covered by a second network device, where the first terminal device may transmit information of the first switching scheme and the measurement results of the links to the first network device. The first network device may determine, according to the received measurement information and the information of the first switching scheme, whether it is proper for the first terminal device to select to switch into the cell covered by the second network device.

Further, in an embodiment, before the first terminal device determines the first switching scheme for the first terminal device and/or the second switching scheme for the second terminal device according to the measurement results, the method further includes: the first terminal device receives configuration information transmitted by the network device, where the configuration information is used to instruct the first terminal device to preferentially transmit information of a cell to be switched by the first terminal device, the cell to be switched enables the first terminal device and the second terminal device to meet a signal strength condition and to be located in a cell covered by a same network device.

That is to say, the first terminal device may transmit to the first network device, information of the first switching scheme, that is, information of a cell to be switched by the first terminal device, and may also transmit information of all cells measured by the first terminal device to the first network device simultaneously, however, when performing the reporting, the terminal device will preferentially report information of a cell to be switched by the first terminal device to the first network device, where the cell to be switched by the first terminal device is: a cell enabling the first terminal device and the second terminal device to not only meet a switched signal strength condition but also to be located in a cell of the same network.

For example, it is assumed that the first terminal device acquires a measurement result of a link between any two of the first terminal device, the second terminal device, and a second network device, and also acquires a measurement result of a link between any two of the first terminal device, the second terminal device and a third network device. If the first terminal device determines the first switching scheme according to the acquired measurement results as that: the first terminal device is switched to a cell A under coverage of the second network device. Thus, since the cell A in the first switching scheme is an optimal switching cell (that is, enabling the first terminal device and the second terminal device to not only meet the switched signal strength condition but also to be located in a cell under the same network coverage), the first terminal device will preferentially transmit information of the first switching scheme (that is, information of the cell A) to the first network device, and then transmit information of a cell under coverage of the third network device and information of other cells except the cell A under coverage of the second network device to the first network device. Therefore, the first network device may confirm the first switching scheme according to these pieces of received information to determine whether the first switching scheme is suitable.

In the embodiment of the present application, a terminal device determines switching schemes for two terminal devices by acquiring link information of a relay terminal device and link information of a remote terminal device, so that the two terminal devices may be located in a cell covered by a same network device as much as possible after they perform cell switching or cell reselection, and thus an effective relay transmission continues between a relay terminal and a remote terminal after cell switching is performed between the relay terminal and the remote terminal.

Moreover, since the first switching scheme and the second switching scheme are determined by the terminal device, in this way, when the terminal device stays in an inactive state or an idle state, the terminal device may determine the switching schemes by itself without by a network device so that better continuity of services between terminal devices is guaranteed.

FIG. 5 is a schematic flowchart of a switching method 500 according to an embodiment of the present application. The method may be performed by a second terminal device, which may be a relay terminal device such as the terminal device 30 in FIG. 3 or a remote terminal device such as the terminal device 40 in FIG. 3. As shown in FIG. 5, the switching method includes:

In 510, a second terminal device acquires a measurement result of a link, where the link includes a measurement result of a link between the second terminal device and a first network device.

In 520, the second terminal device transmits the measurement result to the first terminal device, where the measurement result is used for the first terminal device to determine a second switching scheme for the second terminal device.

In 530, the second terminal device receives a switching command transmitted by the first terminal device, and performs the second switching scheme according to the switching command.

In an embodiment, the first terminal device is a relay terminal device, and the second terminal device is a remote terminal device; or the first terminal device is a remote terminal device, and the second terminal device is a relay terminal device.

Specifically, when a second terminal device is performing cell switching, the second terminal device acquires a measurement result of a link between the second terminal device and a first network device, and transmits the measurement result to the first terminal device so that the first terminal device determines a second switching scheme for the second terminal device or may also determine its own first switching scheme according to the measurement result of the link between the first network device and the second terminal device and the measurement result of the link between the first network device and the first terminal device. Since the first terminal device simultaneously acquires the measurement result of the link between the second terminal device and the first network device and the measurement result of the link between the first terminal device and the first network device, when the first terminal device determines a switching scheme for the second terminal device, measurement results of multiple links may be comprehensively considered so that a cell covered by a same network device as the first terminal device is selected for the second terminal device as its reselected cell to be accessed as much as possible.

In an embodiment, the measurement result of the link acquired by the second terminal device may further include a measurement result of a link between the second terminal device and the first terminal device.

That is, the first terminal device may determine the measurement result of the link between the first network device and the first terminal device, and receive the measurement result of the link between the first network device and the second terminal device and the measurement result of the link between the first terminal device and the second terminal device that are transmitted by the second terminal device, thereby with a comprehensive consideration of measurement results of these three links, the first switching scheme and/or the second switching scheme are/is determined. Since a situation of a link between two terminal devices is considered, the two terminal devices are switched into a cell covered by a same network device as much as possible. Certainly, the measurement result of the link between the first terminal device and the second terminal device may also be determined by the first terminal device itself.

In an embodiment, the measurement result of the link includes a measurement result of link quality of the link, and/or a measurement result of link state of the link.

In an embodiment, if the first terminal device stays in a connected state, the first switching scheme includes that the first terminal device is switched from a cell covered by the first network device to a cell covered by a second network device, or the first terminal device does not perform cell switching;

if the first terminal device stays in an inactive state or an idle state, the first switching scheme includes that the first terminal device reselects the cell covered by the second network device as a cell to be accessed, or the first terminal device does not perform cell reselection;

if the second terminal device stays in a connected state, the second switching scheme includes that the second terminal device is switched from a cell covered by the first network device to a cell covered by the second network device or a cell covered by other network devices, or the second terminal device does not perform cell switching;

if the second terminal device stays in an inactive state or an idle state, the second switching scheme includes that the second terminal device reselects the cell covered by the second network device or a cell covered by other network devices as a cell to be accessed, or the second terminal device does not perform cell reselection.

In an embodiment, the second terminal device transmitting the measurement result to the first terminal device in 520 includes: the second terminal device transmits the measurement result that is carried in an adaptation layer or a direct interface protocol stack PC5 to the first terminal device.

That is, interaction information such as the measurement results among the first terminal device, the second terminal device, and the first network device may be carried in an adaptation layer or carried in signaling or data of an existing direct interface protocol stack PC5.

In an embodiment, if the first terminal device determines that a link connection is maintained between the first terminal device and the second terminal device, the second terminal device and the first terminal device are located in a cell covered by a same network device after the second terminal device performs the second switching scheme.

Specifically, the first terminal device may determine, according to the measurement results of the links, whether a link connection is maintained between the first terminal device and the second terminal device, if the first terminal device determines that a link connection is maintained between the first terminal device and the second terminal device, for example, when the first network device determines that a link connection should be maintained between the first terminal device and the second terminal device or there is a need to continue maintaining a link connection, the second switching scheme determined by the first terminal device will cause the second terminal device and the first terminal device that has been performed the first switching scheme to be located in a cell covered by a same network device after the second terminal device performs the second switching scheme.

In an embodiment, if the first terminal device determines that link connection is not maintained between the first terminal device and the second terminal device, the method further includes: the second terminal device receives release indication information transmitted by the first terminal device, and releases a link connection with the first terminal device according to the release indication information.

In an embodiment, if the second switching scheme includes that the second terminal device reselects the cell covered by the second network device as a cell to be accessed, the switching command further includes information of the cell to be accessed that is reselected by the second terminal device.

In an embodiment, if the second switching scheme includes that the second terminal device is switched to a cell covered by the second network device, the switching command further includes a resource for the second terminal device to perform cell switching.

In the embodiment of the present application, a terminal device may allow an another terminal device to determine switching schemes for the two terminal devices according to link information of the two terminal devices by reporting its own link information to the another terminal device, so that the two terminal devices may be located in a cell covered by a same network device as much as possible after they perform cell switching or cell reselection, and thus an effective relay transmission continues between a relay terminal and a remote terminal after cell switching is performed between the relay terminal and the remote terminal.

Moreover, since the first switching scheme and the second switching scheme are determined by the terminal device, in this way, when the terminal device stays in an inactive state or an idle state, the terminal device may determine the switching schemes by itself without by a network device so that better continuity of services between terminal devices is guaranteed.

Figure 6:
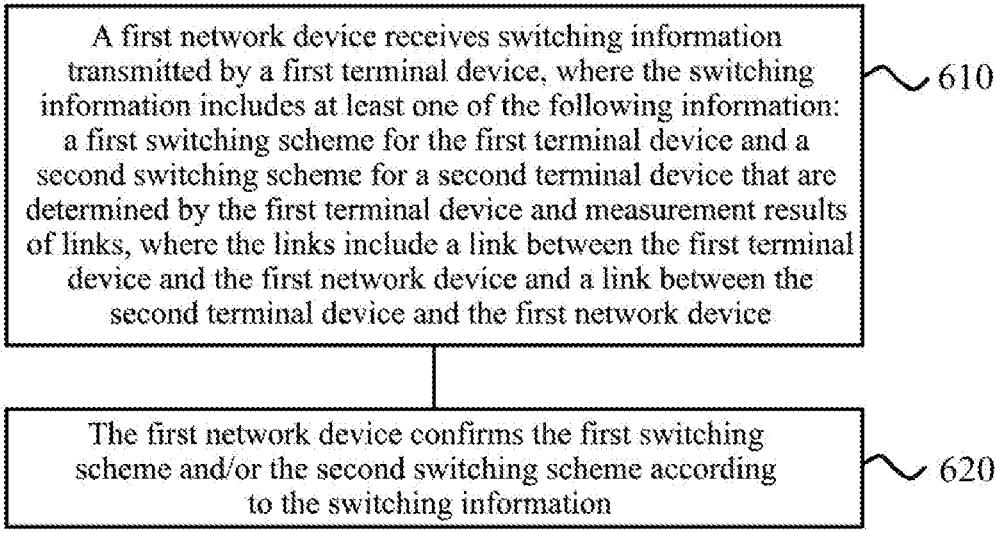
FIG. 6 is a schematic flowchart of a switching method according to an embodiment of the present application.

FIG. 6 is a schematic flowchart of a switching method 600 according to an embodiment of the present application. The method may be performed by a second network device such as the network device 10 in FIG. 3. As shown in FIG. 6, the switching method includes:

In 610, a first network device receives switching information transmitted by a first terminal device, where the switching information includes at least one of the following information: a first switching scheme for the first terminal device and a second switching scheme for a second terminal device that are determined by the first terminal device and measurement results of links, where the links include a link between the first terminal device and the first network device and a link between the second terminal device and the first network device.

In 620, the first network device confirms the first switching scheme and/or the second switching scheme according to the switching information.

In an embodiment, the measurement results of the links include measurement results of link quality of the links, and/or measurement results of link state of the links.

In an embodiment, the first terminal device is a relay terminal device, and the second terminal device is a remote terminal device; or the first terminal device is a remote terminal device, and the second terminal device is a relay terminal device.

Specifically, when a first terminal device and a second terminal device are performing cell switching, the first terminal device may acquire a measurement result of a link between a first network device and the first terminal device and a measurement result of a link between the first network device and the second terminal device. The first terminal device may determine, according to the measurement results of these links, a first switching scheme for the first terminal device and a second switching scheme for the second terminal device. At this time, the first terminal device may further transmit at least one of the first switching scheme, the second switching scheme, and the measurement results of the links to the first network device, and the first network device confirms, according to these pieces of received switching information, the first switching scheme and/or the second switching scheme to determine whether the first switching scheme and/or the second switching scheme is an optimum switching scheme, that is, to determine whether the first terminal device and/or the second terminal device can perform its own switching scheme to switch to an appropriate network or reselect the appropriate network as a network to be accessed.

For example, the first switching scheme determined by the first terminal device includes that the first terminal device is switched to a cell covered by a second network device, where the first terminal device may transmit information of the first switching scheme and the measurement results of the links to the first network device. The first network device may determine, according to the received measurement information and the information of the first switching scheme, whether it is proper for the first terminal device to select to switch into the cell covered by the second network device.

In an embodiment, the first switching scheme includes that the first terminal device is switched from a cell covered by the first network device to a cell covered by the second network device, or the first terminal device does not perform cell switching; the second switching scheme includes that the second terminal device reselects the cell covered by the second network device or a cell covered by other network devices as a cell to be accessed, or the second terminal device does not perform cell reselection.

In an embodiment, the method further includes: the network device transmits configuration information to the terminal device, where the configuration information is used to instruct the first terminal device to preferentially transmit information of a cell to be switched by the first terminal device, the cell to be switched enables the first terminal device and the second terminal device to meet a signal strength condition and to be located in a cell covered by a same network device.

That is to say, the first terminal device may transmit to the first network device, information of the first switching scheme, that is, information of a cell to be switched by the first terminal device, and may also transmit information of all cells measured by the first terminal device to the first network device simultaneously, however, when performing the reporting, the terminal device will preferentially report information of a cell to be switched by the first terminal device to the first network device, where the cell to be switched by the first terminal device is a cell enabling the first terminal device and the second terminal device to not only meet a switched signal strength condition but also to be located in a cell of the same network.

For example, it is assumed that the first terminal device acquires a measurement result of a link among the first terminal device, the second terminal device, and a second network device, and also acquires a measurement result of a link among the first terminal device, the second terminal device and a third network device. If the first terminal device determines the first switching scheme according to these acquired measurement results as: the first terminal device is switched to a cell A under coverage of the second network device, since the cell A in the first switching scheme is an optimum switching cell (that is, enabling the first terminal device and the second terminal device to not only meet the switched signal strength condition but also to be located in a cell under the same network coverage), the first terminal device will preferentially transmit information of the first switching scheme (that is, information of the cell A) to the first network device, and then transmit information of a cell under coverage of the third network device and information of other cells except the cell A under coverage of the second network device to the first network device. Therefore, the first network device may confirm the first switching scheme according to these pieces of received information.

In the embodiment of the present application, after receiving information of a switching scheme transmitted by a terminal device and determined by the terminal device, a network device confirms the switching scheme to determine whether respective switching schemes for a relay terminal device and a remote terminal device are appropriate. Since the switching scheme determined by the terminal device enables two terminal devices to be located in cells covered by themselves as much as possible after they perform cell switching or cell reselection, and thus an effective relay transmission continues between a relay terminal and a remote terminal after cell switching is performed between the relay terminal and the remote terminal.

Figure 7:
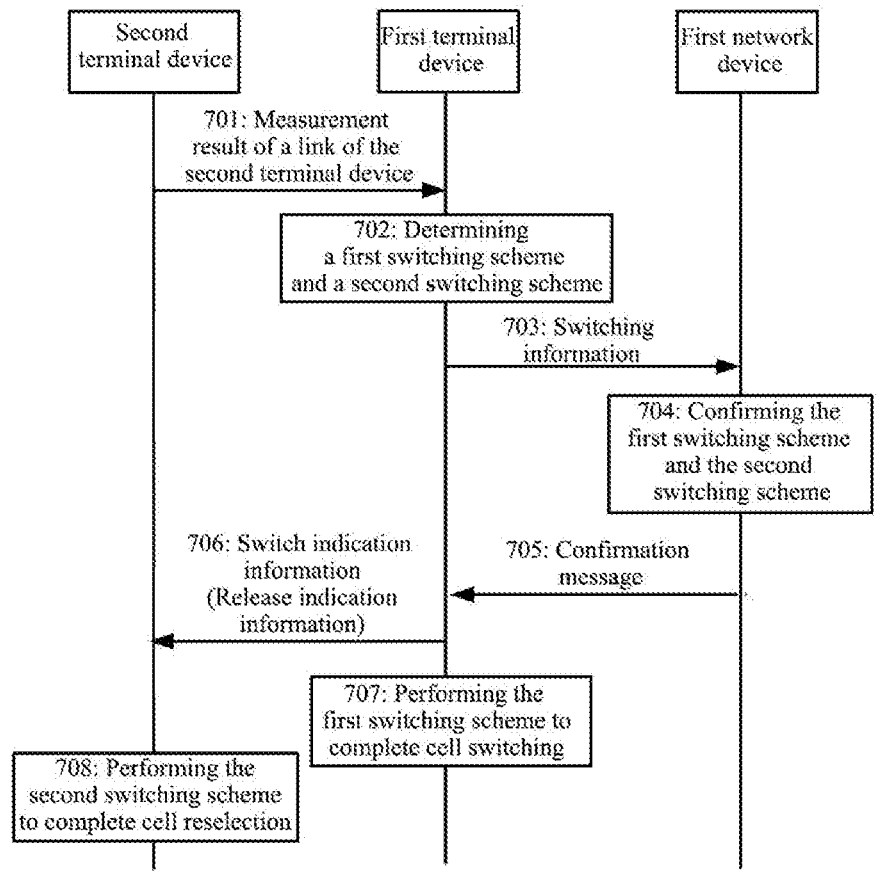
FIG. 7 is a process interaction diagram of a switching method according to an embodiment of the present application.
Figure 8:
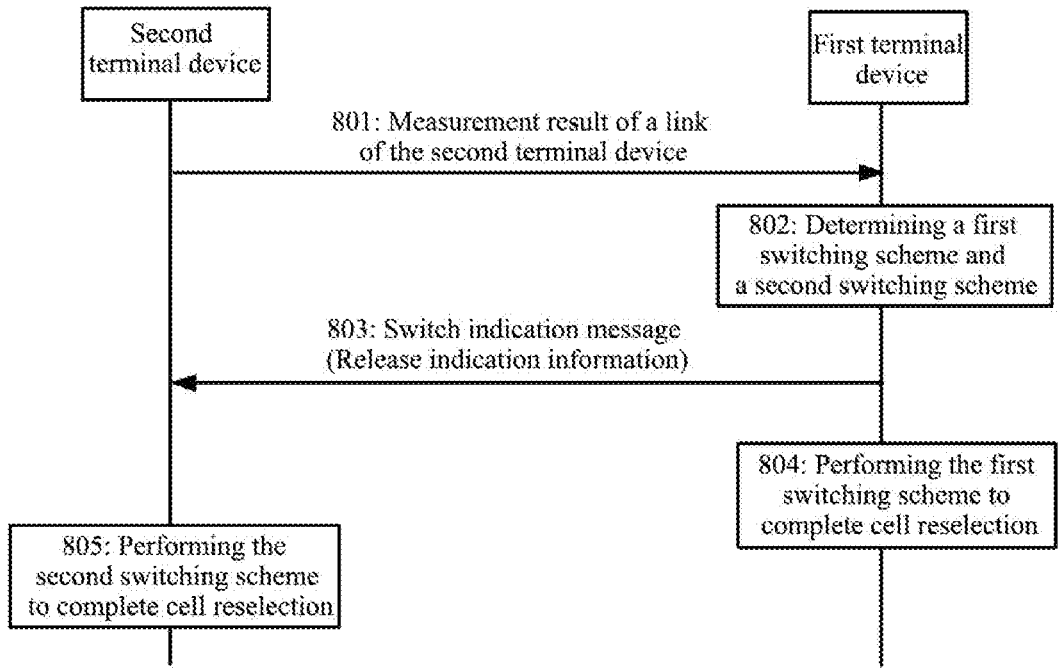
FIG. 8 is a process interaction diagram of a switching method according to an embodiment of the present application.

The switching method in the embodiments of the present application will be specifically described hereunder with two detailed examples in combination with FIG. 7 and FIG. 8. It should be understood that FIG. 7 and FIG. 8 are merely examples, and the embodiments of the present application are not limited thereto.

FIG. 7 is a process interaction diagram of a switching method according to an embodiment of the present application. The first terminal device in FIG. 7 stays in a connected state, and the second terminal device stays in an inactive state or an idle state. As shown in FIG. 7, the method includes:

701, the second terminal device transmits a measurement result of a link of the second terminal device to the first terminal device.

The measurement result of the link of the second terminal device includes a measurement result of a link (for example, link status, or link quality or the like) between the second terminal device and a first network device.

702, the first terminal device determines a first switching scheme for the first terminal device and a second switching scheme for the second terminal device.

Specifically, the first terminal device determines a first switching scheme and a second switching scheme according to a measurement result of a link of the first terminal device and the measurement result of the link of the second terminal device.

The measurement result of the link of the first terminal device includes a measurement result of a link between the first terminal device and the first network device and a measurement result of a link between the first terminal device and the second terminal device.

In an embodiment, the first terminal device may further acquire a pairing relationship/connection relationship between the first terminal device and the second terminal device, and determine the first switching scheme and the second switching scheme according to the pairing relationship/connection relationship and the measurement results of the links described above.

The first switching scheme includes that the first terminal device is switched from a cell covered by the first network device to a cell covered by a second network device; and the second switching scheme includes that the second terminal device reselects the cell covered by the second network device as a cell to be accessed.

703, the first terminal device transmits switching information to the first network device.

The switching information includes at least one of the following information: the first switching scheme for the first terminal device and the second switching scheme for the second terminal device that are determined by the first terminal device, and the measurement results of the links.

704, the first network device confirms the first switching scheme and the second switching scheme according to the switching information.

705, the first network device transmits a confirmation message to the first terminal device.

706, after receiving the confirmation message, the first terminal device transmits a switch indication message to the second terminal device.

The switch indication message includes cell information of a cell to be reselected by the second terminal device, and the switch indication message is used to instruct the second terminal device to perform the second switching scheme.

707, the first terminal device performs the first switching scheme to switch to a cell covered by a second network device.

708, the second terminal device performs the second switching scheme to switch to a cell covered by a second network device.

If the first terminal device determines that there is no need or it is not necessary or it is not appropriate to continue maintaining a link connection between the first terminal device and the second terminal device, or the current signal strength condition cannot make sure that a better link connection is maintained between the first terminal device and the second terminal device, then the first terminal device may further transmit release indication information to the second terminal device to indicate a release of the link connection therebetween. The release indication information may be transmitted to the second terminal device together with the switch indication information.

FIG. 8 is a process interaction diagram of a switching method according to an embodiment of the present application. The first terminal device and the second terminal device in FIG. 8 both stay in an inactive state or an idle state. As shown in FIG. 8, the method includes:

801, the second terminal device transmits a measurement result of a link of the second terminal device to the first terminal device.

The measurement result of the link of the second terminal device includes a measurement result of a link (for example, link status, link quality, or the like) between the second terminal device and a first network device.

802, the first terminal device determines a first switching scheme for the first terminal device and a second switching scheme for the second terminal device.

Specifically, the first terminal device determines a first switching scheme and a second switching scheme according to a measurement result of a link of the first terminal device and the measurement result of the link of the second terminal device.

The measurement result of the link of the first terminal device includes a measurement result of a link between the first terminal device and the first network device, and a measurement result of a link between the first terminal device and the second terminal device.

In an embodiment, the first terminal device may further acquire a pairing relationship/connection relationship between the first terminal device and the second terminal device, and determine the first switching scheme and the second switching scheme according to the pairing relationship/connection relationship and the measurement results of the links described above.

The first switching scheme includes that the first terminal device reselects a cell covered by a second network device as a cell to be accessed; and the second switching scheme includes that the second terminal device reselects a cell covered by a second network device as a cell to be accessed.

803, the first terminal device transmits a switch indication message to the second terminal device.

The switch indication message includes cell information of a cell to be reselected by the second terminal device, and the switch indication message is used to instruct the second terminal device to perform the second switching scheme.

804, the first terminal device performs the first switching scheme, and reselects a cell covered by a second network device as a cell to be accessed.

805, the second terminal device performs the second switching scheme, and reselects a cell covered by a second network device as a cell to be accessed.

If the first terminal device determines that there is no need or it is not necessary or it is not appropriate to continue maintaining a link connection between the first terminal device and the second terminal device, or the current signal strength condition cannot make sure that a better link connection is maintained between the first terminal device and the second terminal device, then the first terminal device may further transmit release indication information to the second terminal device to indicate a release of the link connection therebetween. The release indication information may be transmitted to the second terminal device together with the switch indication information.

It should be understood that, in various embodiments of the present application, the size of sequence numbers of each of the above processes do not mean an execution order. The execution order of each process should be determined by its function and internal logic rather than being intended to limit implementations in the embodiments of the present application.

Figure 9:
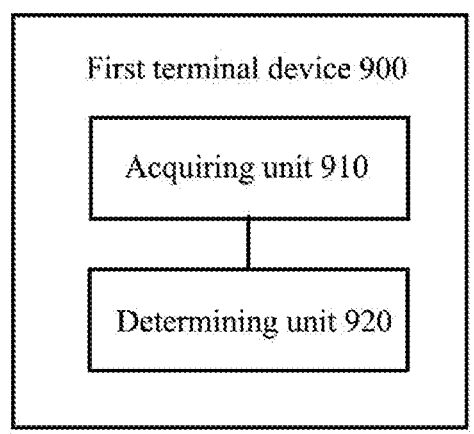
FIG. 9 is a schematic block diagram of a terminal device according to an embodiment of the present application.

FIG. 9 is a schematic block diagram of a terminal device 900 according to an embodiment of the present application. As shown in FIG. 9, the terminal device 900 includes an acquiring unit 910 and a determining unit 920.

The acquiring unit 910 is configured to acquire measurement results of links, where the links include a link between the first terminal device and a first network device and a link between the first network device and a second terminal device.

The determining unit 920 is configured to determine a first switching scheme for the first terminal device and/or a second switching scheme for the second terminal device according to the measurement results acquired by the acquiring unit 910.

Therefore, a terminal device determines switching schemes for two terminal devices by acquiring link information of a relay terminal device and link information of a remote terminal device, so that the two terminal devices may be located in a cell covered by a same network device as much as possible after they perform cell switching or cell reselection, and thus an effective relay transmission continues between a relay terminal and a remote terminal after cell switching is performed between the relay terminal and the remote terminal.

Moreover, since the first switching scheme and the second switching scheme are determined by the terminal device, in this way, when the terminal device stays in an inactive state or an idle state, the terminal device may determine the switching schemes by itself without by a network device so that better continuity of services between terminal devices is guaranteed.

In an embodiment, the links further include a link between the first terminal device and the second terminal device.

In an embodiment, the first terminal device further includes a transmitting unit configured to: transmit a switching command to the second terminal device, where the switching command is used to instruct the second terminal device to perform the second switching scheme.

In an embodiment, the determining unit 920 is specifically configured to: determine the first switching scheme and/or the second switching scheme according to states in which the first terminal device and the second terminal device stay and the measurement results.

In an embodiment, if the first terminal device stays in a connected state, the first switching scheme includes that the first terminal device is switched from a cell covered by the first network device to a cell covered by a second network device, or the first terminal device does not perform cell switching;

if the first terminal device stays in an inactive state or an idle state, the first switching scheme includes that the first terminal device reselects the cell covered by the second network device as a cell to be accessed, or the first terminal device does not perform cell reselection;

if the second terminal device stays in a connected state, the second switching scheme includes that the second terminal device is switched from a cell covered by the first network device to a cell covered by the second network device or a cell covered by other network devices, or the second terminal device does not perform cell switching;

if the second terminal device stays in an inactive state or an idle state, the second switching scheme includes that the second terminal device reselects the cell covered by the second network device or a cell covered by other network devices as a cell to be accessed, or the second terminal device does not perform cell reselection.

In an embodiment, the determining unit 920 is specifically configured to: determine, according to the measurement results, whether a link connection is maintained between the first terminal device and the second terminal device; and determine the first switching scheme and/or the second switching scheme according to whether a link connection is maintained between the first terminal device and the second terminal device.

In an embodiment, if the first terminal device determines that a link connection is maintained between the first terminal device and the second terminal device, the first terminal device and the second terminal device are located in a cell covered by a same network device after the first terminal device performs the first switching scheme and the second terminal device performs the second switching scheme.

In an embodiment, if the first terminal device determines that link connection is not maintained between the first terminal device and the second terminal device, the transmitting unit is further configured to: transmit release indication information to the second terminal device, where the release indication information is used to instruct the second terminal device to release a link connection with the first terminal device.

In an embodiment, the acquiring unit 910 is specifically configured to: before the determining unit 920 determines the first switching scheme for the first terminal device and/or the second switching scheme for the second terminal device according to the measurement results, acquire associated information between the first terminal device and the second terminal device, where the associated information includes a pairing relationship or a connection relationship between the first terminal device and the second terminal device.

The determining unit 920 is specifically configured to: determine the first switching scheme and/or the second switching scheme according to the associated information and the measurement results.

In an embodiment, if the first terminal device stays in a connected state, the transmitting unit is further configured to: transmit switching information to the first network device, where the switching information includes at least one of the following information: information of the first switching scheme, information of the second switching scheme, and the measurement results.

In an embodiment, the first terminal device further includes a receiving unit configured to: before the determining unit 920 determines the first switching scheme for the first terminal device and/or the second switching scheme for the second terminal device according to the measurement results, receive configuration information transmitted by the first network device, where the configuration information is used to instruct the first terminal device to preferentially transmit information of a cell to be switched by the first terminal device, the cell to be switched enables the first terminal device and the second terminal device to meet a signal strength condition and to be located in a cell covered by a same network device.

In an embodiment, the first terminal device is a relay terminal device, and the second terminal device is a remote terminal device; or the first terminal device is a remote terminal device, and the second terminal device is a relay terminal device.

In an embodiment, the measurement results of the links include measurement results of link quality of the links, and/or measurement results of link state of the links.

In an embodiment, the acquiring unit 910 is specifically configured to: determine a measurement result of a link between the first terminal device and the first network device, and receive a measurement result of a link between the first network device and the second terminal device that is transmitted by the second terminal device.

In an embodiment, the acquiring unit 910 is specifically used for: the first terminal device to determine a measurement result of a link between the first terminal device and the second terminal device; or the first terminal device to receive a measurement result of a link between the first terminal device and the second terminal device that is transmitted by the second terminal device.

In an embodiment, the acquiring unit 910 is specifically used for: the first terminal device to acquire a measurement result of a link that is transmitted by the second terminal device and is carried in an adaptation layer or a direct interface protocol stack PC5.

Figure 10:
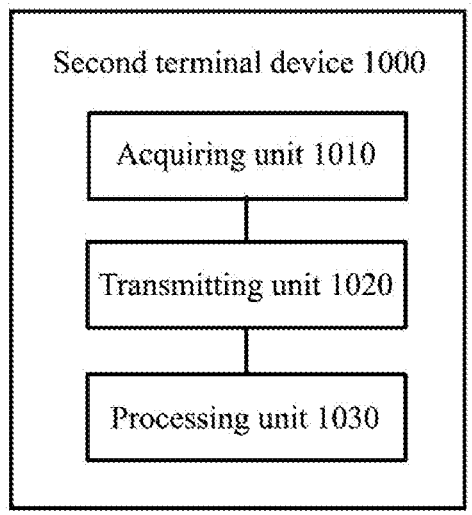
FIG. 10 is a schematic block diagram of a terminal device according to an embodiment of the present application.

FIG. 10 is a schematic block diagram of a terminal device 1000 according to an embodiment of the present application. As shown in FIG. 10, the terminal device 1000 includes an acquiring unit 1010, a transmitting unit 1020, and a processing unit 1030.

The acquiring unit 1010 is configured to acquire a measurement result of a link, where the link includes a measurement result of a link between the second terminal device and a first network device.

The transmitting unit 1020 is configured to transmit the measurement result acquired by the acquiring unit 1010 to the first terminal device, where the measurement result is used for the first terminal device to determine a second switching scheme for the second terminal device.

The processing unit 1030 is configured to receive a switching command transmitted by the first terminal device, and perform the second switching scheme according to the switching command.

Therefore, a terminal device may allow an another terminal device to determine switching schemes for the two terminal devices according to link information of the two terminal devices by reporting its own link information to the another terminal device, so that the two terminal devices may be located in a cell covered by a same network device as much as possible after they perform cell switching or cell reselection, and thus an effective relay transmission continues between a relay terminal and a remote terminal after cell switching is performed between the relay terminal and the remote terminal.

Moreover, since the first switching scheme and the second switching scheme are determined by the terminal device, in this way, when the terminal device stays in an inactive state or an idle state, the terminal device may determine the switching schemes by itself without by a network device so that better continuity of services between terminal devices is guaranteed.

In an embodiment, the link further includes a link between the first terminal device and the second terminal device.

In an embodiment, if the first terminal device stays in a connected state, the first switching scheme includes that the first terminal device is switched from a cell covered by the first network device to a cell covered by a second network device, or the first terminal device does not perform cell switching;

if the first terminal device stays in an inactive state or an idle state, the first switching scheme includes that the first terminal device reselects the cell covered by the second network device as a cell to be accessed, or the first terminal device does not perform cell reselection;

if the second terminal device stays in a connected state, the second switching scheme includes that the second terminal device is switched from a cell covered by the first network device to a cell covered by the second network device or a cell covered by other network devices, or the second terminal device does not perform cell switching;

if the second terminal device stays in an inactive state or an idle state, the second switching scheme includes that the second terminal device reselects the cell covered by the second network device or a cell covered by other network devices as a cell to be accessed, or the second terminal device does not perform cell reselection.

In an embodiment, if the first terminal device determines that a link connection is maintained between the first terminal device and the second terminal device, the second terminal device and the first terminal device are located in a cell covered by a same network device after the second terminal device performs the second switching scheme.

In an embodiment, if the first terminal device determines that link connection is not maintained between the first terminal device and the second terminal device, the processing unit 1030 is further configured to: receive release indication information transmitted by the first terminal device, and release a link connection with the first terminal device according to the release indication information.

In an embodiment, the first terminal device is a relay terminal device, and the second terminal device is a remote terminal device; or the first terminal device is a remote terminal device, and the second terminal device is a relay terminal device.

In an embodiment, the measurement result of the link includes a measurement result of link quality of the link, and/or a measurement result of link state of the link.

In an embodiment, the transmitting unit 1020 is specifically configured to: transmit the measurement result that is carried in an adaptation layer or a direct interface protocol stack PC5 to the first terminal device.

Figure 11:
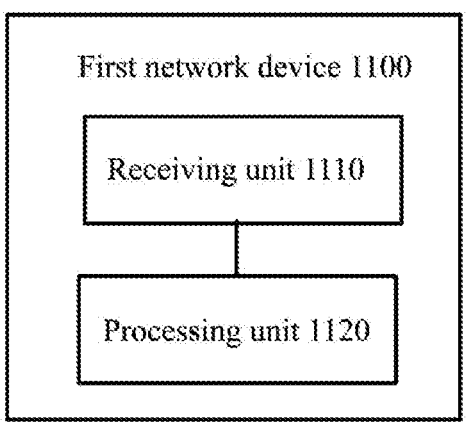
FIG. 11 is a schematic block diagram of a network device according to an embodiment of the present application.

FIG. 11 is a schematic block diagram of a network device 1100 according to an embodiment of the present application. As shown in FIG. 11, the network device 1100 includes a receiving unit 1110 and a processing unit 1120.

The receiving unit 1110 is configured to receive switching information transmitted by a first terminal device, where the switching information includes at least one of the following information: a first switching scheme for the first terminal device and a second switching scheme for a second terminal device that are determined by the first terminal device and measurement results of links, where the links include a link between the first terminal device and the first network device and a link between the second terminal device and the first network device.

The processing unit 1120 is configured to confirm the first switching scheme and/or the second switching scheme according to the switching information received by the receiving unit 1110.

Therefore, after receiving information of a switching scheme transmitted by a terminal device and determined by the terminal device, a network device confirms the switching scheme to determine whether respective switching schemes for a relay terminal device and a remote terminal device are appropriate. Since the switching scheme determined by the terminal device enables two terminal devices to be located in cells covered by themselves as much as possible after they perform cell switching or cell reselection, and thus an effective relay transmission continues between a relay terminal and a remote terminal after cell switching is performed between the relay terminal and the remote terminal.

In an embodiment, the links further include a link between the first terminal device and the second terminal device.

In an embodiment, the first switching scheme includes that the first terminal device is switched from a cell covered by the first network device to a cell covered by the second network device, or the first terminal device does not perform cell switching; the second switching scheme includes that the second terminal device reselects the cell covered by the second network device or a cell covered by other network devices as a cell to be accessed, or the second terminal device does not perform cell reselection.

In an embodiment, the first network device further includes a transmitting unit configured to: transmit configuration information to the terminal device, where the configuration information is used to instruct the first terminal device to preferentially transmit information of a cell to be switched by the first terminal device, the cell to be switched enables the first terminal device and the second terminal device to meet a signal strength condition and to be located in a cell covered by a same network device.

In an embodiment, the measurement results of the links include measurement results of link quality of the links, and/or measurement results of link state of the links.

In an embodiment, the first terminal device is a relay terminal device, and the second terminal device is a remote terminal device; or the first terminal device is a remote terminal device, and the second terminal device is a relay terminal device.

Figure 12:
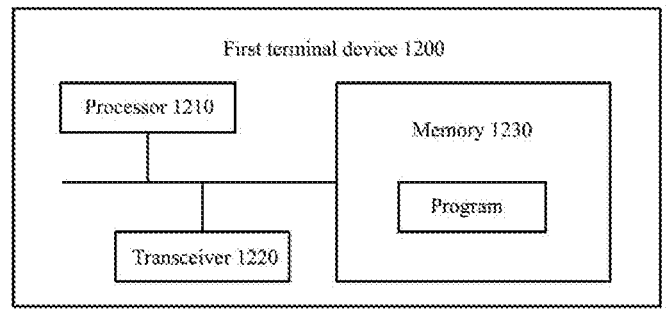
FIG. 12 is a schematic structural diagram of a terminal device according to an embodiment of the present application.

FIG. 12 is a schematic structural diagram of a terminal device 1200 according to an embodiment of the present application. As shown in FIG. 12, the terminal device includes a processor 1210, a transceiver 1220, and a memory 1230, where the processor 1210, the transceiver 1220, and the memory 1230 communicate with each other through an internal connection path. The memory 1230 is configured to store an instruction, and the processor 1210 is configured to execute the instruction stored in the memory 1230 to control the transceiver 1220 to receive a signal or transmit a signal.

The processor 1210 is configured to: acquire measurement results of links, where the links include a link between the first terminal device and a first network device and a link between the first network device and a second terminal device; and determine a first switching scheme for the first terminal device and/or a second switching scheme for the second terminal device according to the measurement results acquired by the acquiring unit.

In an embodiment, the processor 1210 may invoke a program code stored in the memory 1230 to perform a corresponding operation of the terminal device in the method 400 shown in FIG. 4, for which details will not be described herein again for brevity.

It should be understood that, in the embodiment of the present application, the processor 1210 may be a Central Processing Unit ("CPU" for short), and the processor 1210 may also be other general-purpose processor, digital signal processor (DSP), application specific integrated circuit (ASIC), a field programmable gate array (FPGA) or other programmable logic device, discrete gate or transistor logic device, discrete hardware component, or the like. The general purpose processor may be a microprocessor; alternatively, the processor may also be any conventional processor or the like.

The memory 1230 may include a read only memory and a random access memory, and provides instructions and data to the processor 1210. A portion of the memory 1230 may also include a non-volatile random access memory. For example, the memory 1230 may also be stored with device type information.

During an implementation, each step of the above method may be completed by an integrated logic circuit of hardware or an instruction in a form of software in the processor 1210. Steps of the positioning method disclosed in combination with the embodiments of the present application may be directly implemented by a hardware processor, or may be implemented by a combination of hardware and software modules in the processor 1210. The software module may be located in a conventional storage medium in the present field such as a random access memory, a flash memory, a read only memory, a programmable read only memory or an electrically erasable programmable memory, a register, and the like. The storage medium is located in the memory 1230. The processor 1210 reads information in the memory 1230, and performs steps of the above method in conjunction with its hardware. To avoid redundancy, details will not be described herein again.

The terminal device 1200 according to the embodiments of the present application may correspond to the terminal device for performing the method 400 in the method 400 described above and the terminal device 900 according to the embodiment of the present application, moreover, each of units or modules in the terminal device 1200 are respectively configured to perform each of operations or processes performed by the terminal device in the method 400 described above. Here, in order to avoid redundancy, detailed description will be omitted.

Figure 13:
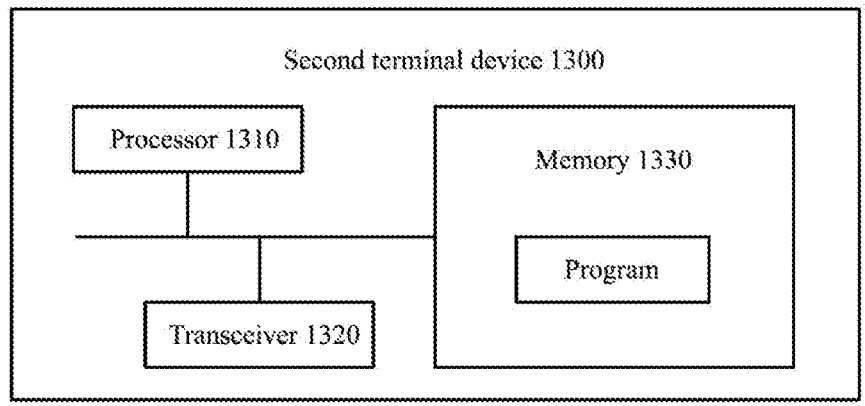
FIG. 13 is a schematic structural diagram of a terminal device according to an embodiment of the present application.

FIG. 13 is a schematic structural diagram of a terminal device 1300 according to an embodiment of the present application. As shown in FIG. 13, the terminal device includes a processor 1310, a transceiver 1320, and a memory 1330, where the processor 1310, the transceiver 1320, and the memory 1330 communicate with each other through an internal connection path. The memory 1330 is configured to store an instruction, and the processor 1310 is configured to execute the instruction stored in the memory 1330 to control the transceiver 1320 to receive a signal or transmit a signal.

The processor 1310 is configured to: acquire a measurement result of a link, where the link includes a measurement result of a link between the second terminal device and a first network device.

The transceiver 1320 is configured to: transmit the measurement result acquired by the acquiring unit to the first terminal device, where the measurement result is used for the first terminal device to determine a second switching scheme for the second terminal device; and receive a switching command transmitted by the first terminal device, where the switching command instructs the second terminal device to perform the second switching scheme.

The processor 1310 is further configured to: perform the second switching scheme according to the switching command.

In an embodiment, the processor 1310 may invoke a program code stored in the memory 1330 to perform a corresponding operation of the terminal device in the method 500 shown in FIG. 5, for which details will not be described herein again for brevity.

It should be understood that, in the embodiment of the present application, the processor 1310 may be a Central Processing Unit ("CPU" for short), and the processor 1310 may also be other general-purpose processor, digital signal processor (DSP), application specific integrated circuit (ASIC), a field programmable gate array (FPGA) or other programmable logic device, discrete gate or transistor logic device, discrete hardware component, or the like. The general purpose processor may be a microprocessor; alternatively, the processor may also be any conventional processor or the like.

The memory 1330 may include a read only memory and a random access memory, and provides instructions and data to the processor 1310. A portion of the memory 1330 may also include a non-volatile random access memory. For example, the memory 1330 may also be stored with device type information.

During an implementation, each step of the above method may be completed by an integrated logic circuit of hardware or an instruction in a form of software in the processor 1310. Steps of the positioning method disclosed in combination with the embodiments of the present application may be directly implemented by a hardware processor, or may be implemented by a combination of hardware and software modules in the processor 1310. The software module may be located in a conventional storage medium in the field such as a random access memory, a flash memory, a read only memory, a programmable read only memory or an electrically erasable programmable memory, a register, and the like. The storage medium is located in the memory 1330. The processor 1310 reads information in the memory 1330, and performs steps of the method described above in conjunction with its hardware. To avoid redundancy, details will not be described herein again.

The terminal device 1300 according to the embodiments of the present application may correspond to the terminal device for performing the method 500 in the method 500 described above and the terminal device 1000 according to the embodiment of the present application, moreover, each of units or modules in the terminal device 1300 are respectively configured to perform each of operations or processes performed by the terminal device in the method 500 described above. Here, in order to avoid redundancy, detailed description will be omitted.

Figure 14:
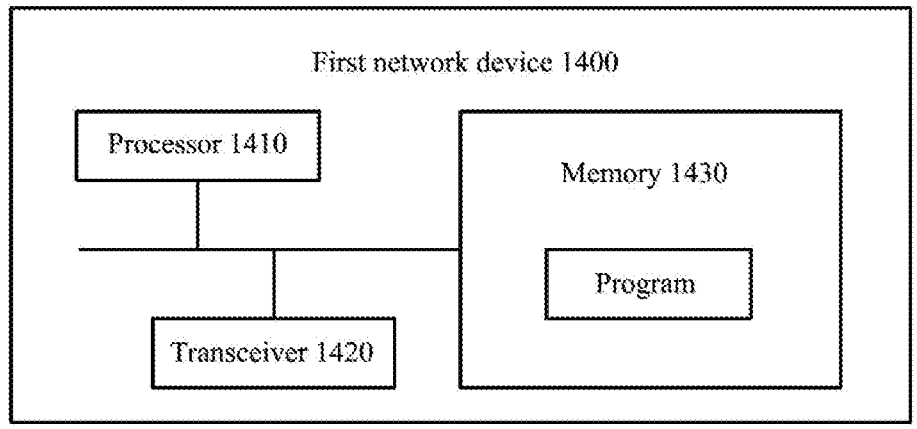
FIG. 14 is a schematic structural diagram of a network device according to an embodiment of the present application.

FIG. 14 is a schematic structural diagram of a network device 1400 according to an embodiment of the present application. As shown in FIG. 14, the network device includes a processor 1410, a transceiver 1420, and a memory 1430, where the processor 1410, the transceiver 1420, and the memory 1430 communicate with each other through an internal connection path. The memory 1430 is configured to store an instruction, and the processor 1410 is configured to execute the instruction stored in the memory 1430 to control the transceiver 1420 to receive a signal or transmit a signal.

The transceiver 1420 is configured to: receive switching information transmitted by a first terminal device, where the switching information includes at least one of the following information: a first switching scheme for the first terminal device and a second switching scheme for a second terminal device that are determined by the first terminal device and measurement results of links, where the links include a link between the first terminal device and the first network device and a link between the second terminal device and the first network device.

The processor 1410 is configured to: confirm the first switching scheme and/or the second switching scheme according to the switching information received by the receiving unit.

In an embodiment, the processor 1410 may invoke a program code stored in the memory 1430 to perform a corresponding operation of the network device in the method 600 shown in FIG. 6, for which details will not be described herein again for brevity.

It should be understood that, in the embodiment of the present application, the processor 1410 may be a Central Processing Unit ("CPU" for short), and the processor 1410 may also be other general-purpose processor, digital signal processor (DSP), application specific integrated circuit (ASIC), a field programmable gate array (FPGA) or other programmable logic device, discrete gate or transistor logic device, discrete hardware component, or the like. The general purpose processor may be a microprocessor; alternatively, the processor may also be any conventional processor or the like.

The memory 1430 may include a read only memory and a random access memory, and provides instructions and data to the processor 1410. A portion of the memory 1430 may also include a non-volatile random access memory. For example, the memory 1430 may also be stored with device type information.

During an implementation, each step of the above method may be completed by an integrated logic circuit of hardware or an instruction in a form of software in the processor 1410. Steps of the positioning method disclosed in connection with the embodiments of the present application may be directly implemented by a hardware processor, or may be implemented by a combination of hardware and software modules in the processor 1410. The software module may be located in a conventional storage medium in the field such as a random access memory, a flash memory, a read only memory, a programmable read only memory or an electrically erasable programmable memory, a register, and the like. The storage medium is located in the memory 1430. The processor 1410 reads information in the memory 1430, and performs steps of the above method in combination with its hardware. To avoid redundancy, details will not be described herein again.

The network device 1400 according to the embodiments of the present application may correspond to the network device for performing the method 600 in the method 600 described above and the network device 1100 according to the embodiment of the present application, moreover, each of units or modules in the network device 1400 are respectively configured to perform each of operations or processes performed by the network device in the method 600 described above. Here, in order to avoid redundancy, detailed description will be omitted.

Figure 15:
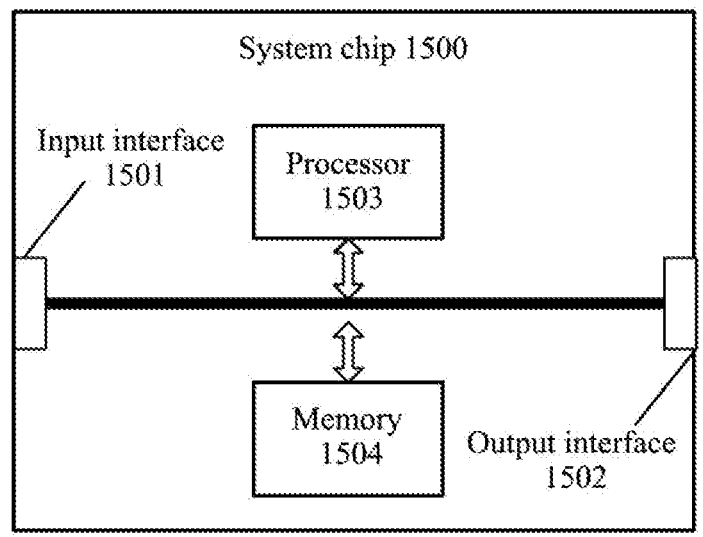
FIG. 15 is a schematic structural diagram of a system chip according to an embodiment of the present application.

FIG. 15 is a schematic structural diagram of a system chip according to an embodiment of the present application. The system chip 1500 of FIG. 15 includes an input interface 1501, an output interface 1502, at least one processor 1503, and a memory 1504. The input interface 1501, the output interface 1502, the processor 1503, and the memory 1504 are connected to each other through an internal connection path. The processor 1503 is configured to execute codes in the memory 1504.

In an embodiment, when the codes are executed, the processor 1503 may implement the method 400 performed by the terminal device in the method embodiment. For the sake of brevity, details will not be described herein again.

In an embodiment, when the codes are executed, the processor 1503 may implement the method 500 performed by the terminal device in the method embodiment. For the sake of brevity, details will not be described herein again.

In an embodiment, when the codes are executed, the processor 1503 may implement the method 600 performed by the network device in the method embodiment. For the sake of brevity, details will not be described herein again.

It may be known to persons of ordinary skill in the art that, the units and algorithm steps of each example that are described with reference to the embodiments disclosed herein may be implemented by electronic hardware or a combination of electronic hardware and computer software. The situation whether these functions are performed by hardware or software depends on specific applications and design constraints of the technical solution. Persons skilled in the art may implement the described functions by using different methods for each specific application, but such implementation should not be regarded as going beyond the scope of the present application.

It may be clearly understood by persons skilled in the art that, for the purpose of convenient and brief description, reference may be made to the corresponding processes in the foregoing method embodiments for detailed working processes of the foregoing systems, devices, and units, and details will not be described herein again.

In several embodiments provided in the present application, it should be understood that the disclosed systems, devices, and methods may be implemented in other manners. For example, the apparatus embodiments described above are merely exemplary. For instance, the division of the units is merely a division of logical functions and there may be other divisions during actual implementations. For instance, multiple units or components may be combined or integrated into another system, or some features may be omitted or not performed. In addition, the presented or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, that is, may be located in one position, or may be distributed on multiple network units. Some or all of the units may be selected according to actual needs to achieve the objectives of the scheme in the embodiments.

In addition, each of the functional units in each of the embodiments of the present application may be integrated into one processing unit, or each of the units may exist alone physically, or two or more units are integrated into one unit.

If implemented in a form of a software functional unit and sold or used as an independent product, the functions may be stored in a computer-readable storage medium. Based on such an understanding, the technical solution of the present application essentially, or the part contributing to the prior art, or a part of the technical solution may be implemented in a form of a software product. The computer software product is stored in a storage medium, and includes several instructions for enabling a computer device (which may be a personal computer, a server, or a network device, etc.) to perform all or some of the steps of the method described in each of the embodiments of the present application. The foregoing storage medium includes: any medium that can store program codes, such as a USB flash disk, a mobile hard disk, a Read-Only Memory ("ROM" for short), a Random Access Memory ("RAM" for short), a magnetic disk, or an optical disc, etc.

The above descriptions are merely specific embodiments of the present application, but the scope of the present application is not limited thereto. Any modification or replacement that may be readily envisaged of by persons skilled in the art within the technical scope disclosed in the present application should fall into the scope of the present application. Thus, the scope of the embodiments of the present application shall be subject to the scope of the claims.

What is claimed is:

1. A switching method, comprising:
   acquiring, by a first terminal device, measurement results of links, wherein the links comprise a link between the first terminal device and a first network device and a link between the first network device and a second terminal device; and
   determining, by the first terminal device, a first cell switching scheme for the first terminal device and/or a second cell switching scheme for the second terminal device according to the measurement results, to enable the first terminal device and the second terminal device to be located in a cell covered by a same network device if the first terminal device and/or the second terminal move.

2. The method according to claim 1, wherein the links further comprise a link between the first terminal device and the second terminal device.

3. The method according to claim 1, further comprising:
   transmitting, by the first terminal device, a switching command to the second terminal device, wherein the switching command is used to instruct the second terminal device to perform the second cell switching scheme.

4. The method according to claim 1, wherein the determining, by the first terminal device, the first cell switching scheme for the first terminal device and/or the second cell switching scheme for the second terminal device according to the measurement results comprises:
   determining, by the first terminal device, the first cell switching scheme and/or the second cell switching scheme according to states in which the first terminal device and the second terminal device stay and the measurement results.

5. The method according to claim 4, wherein: if the first terminal device stays in a connected state, the first cell switching scheme comprises that the first terminal device is switched from a cell covered by the first network device to a cell covered by a second network device, or the first terminal device does not perform cell switching;
   if the first terminal device stays in an inactive state or an idle state, the first cell switching scheme comprises that the first terminal device reselects a cell covered by the second network device as a cell to be accessed, or the first terminal device does not perform cell reselection;
   if the second terminal device stays in a connected state, the second cell switching scheme comprises that the second terminal device is switched from a cell covered by the first network device to a cell covered by the second network device or a cell covered by other network devices, or the second terminal device does not perform cell switching;
   if the second terminal device stays in an inactive state or an idle state, the second cell switching scheme comprises that the second terminal device reselects a cell covered by the second network device or a cell covered by other network devices as a cell to be accessed, or the second terminal device does not perform cell reselection.

6. The method according to claim 1, wherein the determining, by the first terminal device, the first cell switching scheme for the first terminal device and/or the second cell switching scheme for the second terminal device according to the measurement results comprises:
   determining, by the first terminal device, according to the measurement results, whether a link connection is maintained between the first terminal device and the second terminal device; and
   determining, by the first terminal device, the first cell switching scheme and/or the second cell switching scheme according to whether a link connection is maintained between the first terminal device and the second terminal device.

7. The method according to claim 6, wherein: if the first terminal device determines that a link connection is maintained between the first terminal device and the second terminal device,
   the first terminal device and the second terminal device are located in a cell covered by a same network device after the first terminal device performs the first cell switching scheme and the second terminal device performs the second cell switching scheme.

8. The method according to claim 1, before the determining, by the first terminal device, the first cell switching scheme for the first terminal device and/or the second cell switching scheme for the second terminal device according to the measurement results, further comprising:
   acquiring, by the first terminal device, associated information between the first terminal device and the second terminal device, wherein the associated information comprises a pairing relationship or a connection relationship between the first terminal device and the second terminal device;
   the determining, by the first terminal device, the first cell switching scheme for the first terminal device and/or the second cell switching scheme for the second terminal device according to the measurement results comprises:
   determining, by the first terminal device, the first cell switching scheme and/or the second cell switching scheme according to the associated information and the measurement results.

9. The method according to claim 1, if the first terminal device stays in a connected state, further comprising:
   transmitting, by the first terminal device, switching information to the first network device, wherein the switching information comprises at least one of the following information: information of the first cell switching scheme, information of the second cell switching scheme, and the measurement results.

10. The method according to claim 1, wherein the acquiring, by the first terminal device, the measurement results of the links comprises:
    determining, by the first terminal device, a measurement result of a link between the first terminal device and the first network device, and receiving a measurement result of a link between the first network device and the second terminal device that is transmitted by the second terminal device.

11. The method according to claim 10, wherein the acquiring, by the first terminal device, the measurement results of the links further comprises:
    determining, by the first terminal device, a measurement result of a link between the first terminal device and the second terminal device; or
    receiving, by the first terminal device, a measurement result of a link between the first terminal device and the second terminal device that is transmitted by the second terminal device.

12. A switching method, comprising:
    acquiring, by a second terminal device, a measurement result of a link, wherein the link comprises a measurement result of a link between the second terminal device and a first network device;

transmitting, by the second terminal device, the measurement result to a first terminal device, wherein the measurement result is used for the first terminal device to determine a second cell switching scheme for the second terminal device, and the first terminal device determines the second cell switching scheme for the second terminal device according to the measurement result and a measurement result of a link between the first terminal device and the first network device, to enable the first terminal device and the second terminal device to be located in a cell covered by a same network device if the first terminal device and/or the second terminal move; and receiving, by the second terminal device, a switching command transmitted by the first terminal device, and performing the second cell switching scheme according to the switching command.

13. The method according to claim 12, wherein: if the first terminal device stays in a connected state, the first cell switching scheme comprises that the first terminal device is switched from a cell covered by the first network device to a cell covered by a second network device, or the first terminal device does not perform cell switching;

if the first terminal device stays in an inactive state or an idle state, the first cell switching scheme comprises that the first terminal device reselects a cell covered by the second network device as a cell to be accessed, or the first terminal device does not perform cell reselection;

if the second terminal device stays in a connected state, the second cell switching scheme comprises that the second terminal device is switched from a cell covered by the first network device to a cell covered by the second network device or a cell covered by other network devices, or the second terminal device does not perform cell switching;

if the second terminal device stays in an inactive state or an idle state, the second cell switching scheme comprises that the second terminal device reselects a cell covered by the second network device or a cell covered by other network devices as a cell to be accessed, or the second terminal device does not perform cell reselection.

14. The method according to claim 12, wherein: if the first terminal device determines that a link connection is maintained between the first terminal device and the second terminal device, the second terminal device and the first terminal device are located in a cell covered by a same network device after the second terminal device performs the second cell switching scheme.

15. The method according to claim 12, if the first terminal device determines that link connection is not maintained between the first terminal device and the second terminal device, further comprising:

receiving, by the second terminal device, release indication information transmitted by the first terminal device, and releasing a link connection with the first terminal device according to the release indication information.

16. The method according to claim 12, wherein the first terminal device is a relay terminal device, and the second terminal device is a remote terminal device; or the first terminal device is a remote terminal device, and the second terminal device is a relay terminal device.

17. The method according to claim 12, wherein the measurement result of the link comprises a measurement result of link quality of the link, and/or a measurement result of link state of the link.

18. The method according to claim 12, wherein the transmitting, by the second terminal device, the measurement result to the first terminal device comprises:

transmitting, by the second terminal device, the measurement result that is carried in an adaptation layer or a direct interface protocol stack PC5 to the first terminal device.

19. A switching method, comprising:

receiving, by a first network device, switching information transmitted by a first terminal device, wherein the switching information comprises at least one of the following information: a first cell switching scheme for the first terminal device and a second cell switching scheme for a second terminal device that are determined by the first terminal device and measurement results of links, wherein the links comprise a link between the first terminal device and the first network device and a link between the second terminal device and the first network device, and the first cell switching scheme for the first terminal device and/or the second cell switching scheme for the second terminal device are determined by the first terminal device according to the measurement results; and confirming, by the first network device, the first cell switching scheme and/or the second cell switching scheme according to the switching information, to enable the first terminal device and the second terminal device to be located in a cell covered by a same network device if the first terminal device and/or the second terminal move.

20. The method according to claim 19, wherein the first cell switching scheme comprises that the first terminal device is switched from a cell covered by the first network device to a cell covered by the second network device, or the first terminal device does not perform cell switching;

the second cell switching scheme comprises that the second terminal device reselects a cell covered by the second network device or a cell covered by other network devices as a cell to be accessed, or the second terminal device does not perform cell reselection.

* * * * *